(12) United States Patent
Stampleman et al.

(10) Patent No.: US 9,305,549 B2
(45) Date of Patent: *Apr. 5, 2016

(54) METHOD AND APPARATUS FOR GENERATION AND AUGMENTATION OF SEARCH TERMS FROM EXTERNAL AND INTERNAL SOURCES

(71) Applicant: PROMPTU SYSTEMS CORPORATION, Menlo Park, CA (US)

(72) Inventors: Joseph Bruce Stampleman, San Carlos, CA (US); Harry Printz, San Francisco, CA (US)

(73) Assignee: PROMPTU SYSTEMS CORPORATION, Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/513,093

(22) Filed: Oct. 13, 2014

(65) Prior Publication Data

US 2015/0032715 A1   Jan. 29, 2015

Related U.S. Application Data

(60) Continuation of application No. 13/667,446, filed on Nov. 2, 2012, now Pat. No. 8,862,596, which is a continuation of application No. 11/930,951, filed on Oct. 31, 2007, now Pat. No. 8,321,427, which is a (Continued)

(51) Int. Cl.
*G10L 15/00* (2013.01)
*G10L 15/22* (2006.01)
(Continued)

(52) U.S. Cl.
CPC .......... *G10L 15/22* (2013.01); *G06F 17/30867*
(2013.01); *G06Q 30/02* (2013.01); *G10L 15/18*
(2013.01); *G10L 17/26* (2013.01); *G06F 17/30861* (2013.01)

(58) Field of Classification Search
CPC .... G10L 15/22; G10L 17/26; G06F 17/30861
USPC ........................................................ 707/749
See application file for complete search history.

(56) References Cited

U.S. PATENT DOCUMENTS 5,553,119 A    9/1996  Mcallister et al.
5,581,655 A   12/1996  Cohen et al.
(Continued)

FOREIGN PATENT DOCUMENTS

EP    1341363    9/2003
EP    1003018    5/2005
(Continued)

OTHER PUBLICATIONS

Amir, A. et al., "Advances in Phonetic Word Spotting", IBM Research Report RJ 10215, Aug. 2001, pp. 1-3.
(Continued)

*Primary Examiner* — Jensen Hu
(74) *Attorney, Agent, or Firm* — Michael A. Glenn; Perkins Coie LLP

(57) ABSTRACT

A method and apparatus to identify names, personalities, titles, and topics that are present in a repository and to identify names, personalities, titles, and topics that are not present in the repository, uses information from external data sources, notably the text used in non-speech, text-based searches, to expand the search terms. The expansion takes place in two forms: (1) finding plausible linguistic variants of existing search terms that are already comprehended in the repository, but that are present under slightly different names; and (2) expanding the existing search term list with items that should be there by virtue of their currency in popular culture, but which for whatever reason have not yet been reflected with content items in the repository.

5 Claims, 1 Drawing Sheet

Related U.S. Application Data division of application No. 10/699,543, filed on Oct. 30, 2003, now Pat. No. 7,519,534.

(60) Provisional application No. 60/422,561, filed on Oct. 31, 2002.

(51) Int. Cl.
*G06Q 30/02* (2012.01)
*G10L 17/26* (2013.01)
*G10L 15/18* (2013.01)
*G06F 17/30* (2006.01)

(56) References Cited

U.S. PATENT DOCUMENTS

| | | |
|---|---|---|
| 5,611,019 A | 3/1997 | Nakatoh et al. |
| 5,698,834 A | 12/1997 | Worthington et al. |
| 5,737,723 A | 4/1998 | Riley et al. |
| 5,752,232 A | 5/1998 | Basore et al. |
| 5,774,859 A | 6/1998 | Houser et al. |
| 5,963,903 A | 10/1999 | Hon et al. |
| 6,009,387 A | 12/1999 | Ramaswamy et al. |
| 6,012,058 A | 1/2000 | Fayyad et al. |
| 6,021,387 A | 2/2000 | Mozer et al. |
| 6,049,767 A | 4/2000 | Printz |
| 6,073,099 A | 6/2000 | Sabourin et al. |
| 6,130,726 A | 10/2000 | Darbee et al. |
| 6,141,640 A | 10/2000 | Moo |
| 6,182,039 B1 | 1/2001 | Rigazio et al. |
| 6,195,641 B1 * | 2/2001 | Loring et al. ............... 704/275 |
| 6,260,013 B1 | 7/2001 | Sejnoha |
| 6,263,308 B1 | 7/2001 | Heckerman et al. |
| 6,298,324 B1 | 10/2001 | Zuberec et al. |
| 6,301,560 B1 | 10/2001 | Masters |
| 6,320,947 B1 | 11/2001 | Joyce et al. |
| 6,336,091 B1 | 1/2002 | Polikaitis et al. |
| 6,374,177 B1 | 4/2002 | Lee et al. |
| 6,374,226 B1 | 4/2002 | Hunt et al. |
| 6,381,316 B2 | 4/2002 | Joyce et al. |
| 6,408,272 B1 | 6/2002 | White et al. |
| 6,415,257 B1 | 7/2002 | Junqua et al. |
| 6,424,935 B1 | 7/2002 | Taylor |
| 6,446,035 B1 | 9/2002 | Grefenstette et al. |
| 6,658,414 B2 | 12/2003 | Bryan et al. |
| 6,665,644 B1 | 12/2003 | Kanevsky et al. |
| 6,711,541 B1 | 3/2004 | Kuhn et al. |
| 6,711,543 B2 | 3/2004 | Cameron |
| 6,714,632 B2 | 3/2004 | Joyce et al. |
| 6,721,633 B2 | 4/2004 | Funk et al. |
| 6,725,022 B1 | 4/2004 | Clayton et al. |
| 6,728,531 B1 | 4/2004 | Lee et al. |
| 6,754,625 B2 | 6/2004 | Olsen et al. |
| 6,799,201 B1 | 9/2004 | Lee et al. |
| 6,804,653 B2 | 10/2004 | Gabel |
| 6,892,083 B2 | 5/2005 | Shostak |
| 6,901,366 B1 | 5/2005 | Kuhn et al. |
| 6,975,993 B1 | 12/2005 | Keiller |
| 6,985,865 B1 | 1/2006 | Packingham et al. |
| 7,013,276 B2 | 3/2006 | Bickley et al. |
| 7,020,609 B2 | 3/2006 | Thrift et al. |
| 7,027,987 B1 | 4/2006 | Franz et al. |
| 7,062,477 B2 | 6/2006 | Fujiwara et al. |
| 7,113,981 B2 | 9/2006 | Slate |
| 7,117,159 B1 | 10/2006 | Packingham et al. |
| 7,158,959 B1 | 1/2007 | Chickering et al. |
| 7,188,066 B2 | 3/2007 | Falcon et al. |
| 7,203,645 B2 | 4/2007 | Pokhariyal et al. |
| 7,219,056 B2 | 5/2007 | Axelrod et al. |
| 7,231,380 B1 | 6/2007 | Pienkos |
| 7,263,489 B2 | 8/2007 | Cohen et al. |
| 7,324,947 B2 | 1/2008 | Jordan et al. |
| 7,428,555 B2 | 9/2008 | Yan |
| 7,447,636 B1 | 11/2008 | Schwartz et al. |
| 7,483,885 B2 | 1/2009 | Chandrasekar et al. |
| 7,519,534 B2 | 4/2009 | Maddux et al. |
| 7,590,605 B2 | 9/2009 | Josifovski |
| 7,654,455 B1 | 2/2010 | Bhatti et al. |
| 7,769,786 B2 | 8/2010 | Patel |
| 7,809,601 B2 | 10/2010 | Shaya et al. |
| 7,844,456 B2 | 11/2010 | Cai et al. |
| 7,904,296 B2 | 3/2011 | Morris |
| 7,934,658 B1 | 5/2011 | Bhatti et al. |
| 7,949,526 B2 | 5/2011 | Ju et al. |
| 8,165,916 B2 | 4/2012 | Hoffberg et al. |
| 8,306,818 B2 | 11/2012 | Chelba et al. |
| 8,321,278 B2 | 11/2012 | Haveliwala et al. |
| 8,321,427 B2 | 11/2012 | Stampleman et al. |
| 8,374,870 B2 | 2/2013 | Braho et al. |
| 8,515,753 B2 | 8/2013 | Kim et al. |
| 8,793,127 B2 | 7/2014 | Printz et al. |
| 2001/0019604 A1 | 9/2001 | Joyce et al. |
| 2002/0015480 A1 | 2/2002 | Daswani et al. |
| 2002/0032549 A1 | 3/2002 | Axelrod et al. |
| 2002/0032564 A1 | 3/2002 | Ehsani et al. |
| 2002/0046030 A1 | 4/2002 | Haritsa et al. |
| 2002/0049535 A1 | 4/2002 | Rigo et al. |
| 2002/0106065 A1 | 8/2002 | Joyce et al. |
| 2002/0146015 A1 | 10/2002 | Bryan et al. |
| 2003/0004728 A1 | 1/2003 | Keiller |
| 2003/0028380 A1 | 2/2003 | Freeland et al. |
| 2003/0033152 A1 | 2/2003 | Cameron |
| 2003/0061039 A1 | 3/2003 | Levin |
| 2003/0065427 A1 | 4/2003 | Funk et al. |
| 2003/0068154 A1 | 4/2003 | Zylka et al. |
| 2003/0069729 A1 | 4/2003 | Bickley et al. |
| 2003/0073434 A1 | 4/2003 | Shostak |
| 2003/0093281 A1 | 5/2003 | Geilhufe et al. |
| 2003/0125928 A1 | 7/2003 | Lee et al. |
| 2003/0177013 A1 | 9/2003 | Falcon et al. |
| 2003/0212702 A1 | 11/2003 | Campos et al. |
| 2004/0077334 A1 | 4/2004 | Joyce et al. |
| 2004/0110472 A1 | 6/2004 | Witkowski et al. |
| 2004/0127241 A1 | 7/2004 | Shostak |
| 2004/0132433 A1 | 7/2004 | Stern et al. |
| 2004/0193408 A1 | 9/2004 | Hunt |
| 2004/0199498 A1 | 10/2004 | Kapur et al. |
| 2005/0010412 A1 | 1/2005 | Aronowitz |
| 2005/0071224 A1 | 3/2005 | Fikes et al. |
| 2005/0125224 A1 | 6/2005 | Myers et al. |
| 2005/0143139 A1 | 6/2005 | Park et al. |
| 2005/0144251 A1 | 6/2005 | Slate |
| 2005/0170863 A1 | 8/2005 | Shostak |
| 2005/0228670 A1 | 10/2005 | Mahajan et al. |
| 2006/0018440 A1 | 1/2006 | Watkins et al. |
| 2006/0028337 A1 | 2/2006 | Li |
| 2006/0050686 A1 | 3/2006 | Velez et al. |
| 2006/0064177 A1 | 3/2006 | Tian et al. |
| 2006/0085521 A1 | 4/2006 | Sztybel |
| 2006/0136292 A1 | 6/2006 | Bhatti et al. |
| 2006/0149635 A1 | 7/2006 | Bhatti et al. |
| 2006/0206339 A1 | 9/2006 | Silvera et al. |
| 2006/0206340 A1 | 9/2006 | Silvera et al. |
| 2006/0259467 A1 | 11/2006 | Westphal |
| 2006/0271546 A1 | 11/2006 | Phung |
| 2007/0027864 A1 | 2/2007 | Collins et al. |
| 2007/0033003 A1 | 2/2007 | Morris |
| 2007/0067285 A1 | 3/2007 | Blume et al. |
| 2007/0179784 A1 | 8/2007 | Thambiratnam et al. |
| 2008/0021860 A1 | 1/2008 | Wiegering et al. |
| 2008/0103887 A1 | 5/2008 | Oldham et al. |
| 2008/0103907 A1 | 5/2008 | Maislos et al. |
| 2008/0250448 A1 | 10/2008 | Rowe et al. |
| 2009/0048910 A1 | 2/2009 | Shenfield et al. |

FOREIGN PATENT DOCUMENTS

| | | |
|---|---|---|
| EP | 1633150 | 3/2006 |
| EP | 1633151 | 3/2006 |
| EP | 1742437 | 1/2007 |
| WO | WO-00/16568 | 3/2000 |
| WO | WO-00/21232 | 4/2000 |
| WO | WO-01/22112 | 3/2001 |
| WO | WO-01/22249 | 3/2001 |

(56) References Cited

FOREIGN PATENT DOCUMENTS

| WO | WO-01/22633 | 3/2001 |
|----|----|----|
| WO | WO-01/22712 | 3/2001 |
| WO | WO-01/22713 | 3/2001 |
| WO | WO-01/39178 | 5/2001 |
| WO | WO-01/57851 | 8/2001 |
| WO | WO-02/07050 | 1/2002 |
| WO | WO-02/11120 | 2/2002 |
| WO | WO-02/17090 | 2/2002 |
| WO | WO-02/097590 | 12/2002 |
| WO | WO-2004/077721 | 9/2004 |
| WO | WO-2006/029269 | 3/2006 |
| WO | WO-2006/033841 | 3/2006 |
| WO | WO-2006/098789 | 9/2006 |
| WO | WO-2004/021149 | 3/2007 |
| WO | WO-2005/079254 | 5/2007 |

OTHER PUBLICATIONS

Belzer, et al., "Symmetric Trellis-Coded Vector Quantization", IEEE Transactions on Communications, IEEE Service Center, Piscataway, NJ, vol. 45, No. 45, par. II, figure 2, Nov. 1997, pp. 1354-1357.

Chan, et al., "Efficient Codebook Search Procedure for Vector-Sum Excited Linear Predictive Coding of Speech", IEEE Electronics Letters; vol. 30, No. 22; Stevanage, GB, ISSN 0013-5194, Oct. 27, 1994, pp. 1830-1831.

Chan, , "Fast Stochastic Codebook Search Through the Use of Odd-Symmetric Crosscorrelation Basis Vectors", Int'l Conference on Acoustics, Speech and Signal Processing; Detroit, Michigan, vol. 1, Par. 1; ISBN 0-7803-2461-5, May 1995, pp. 21-24.

Chen, et al., "Diagonal Axes method (DAM): A Fast Search Algorithm for Vecotr Quantization", IEEE Transactions on Circuits and Systems for Video Technology, Piscataway, NJ; vol. 7, No. 3, ISSN 1051-8215; Par. I, II, Jun. 1997, pp. 555-559.

Hanzo, et al., "Voice Compression and Communications—Principles and Applications for Fixed and Wireless Channels", Wiley, ISBN 0-471-15039-8; par. 4.3.3, 2001, pp. 108-111.

Salami, et al., "A Fully Vector Quantised Self-Excited Vocoder", Int'l Conference on Acoustics, Speech & Signal Processing; vol. 1, par. 3.1; Glasgow, May 1989, pp. 124-127.

Schotz, S. , "Automatic prediction of speaker age using CART", Course paper for course in Speech Recognition, Lund University, retrieved online from url: http://person2.sol.lu.se/SusznneSchotz/downloads/SR_paper_SusanneS2004.pdf, 2003, 8 pages.

\* cited by examiner

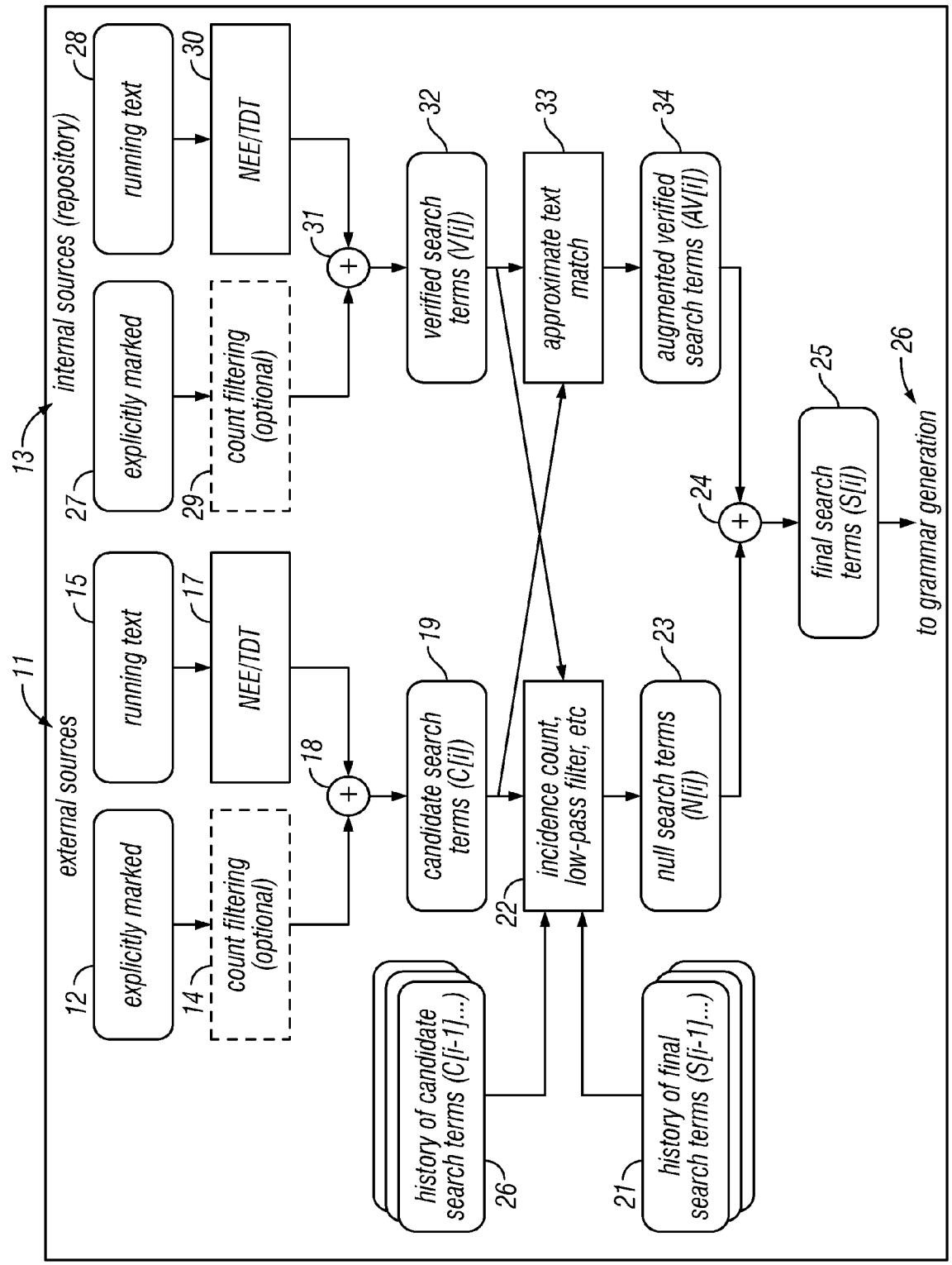

METHOD AND APPARATUS FOR GENERATION AND AUGMENTATION OF SEARCH TERMS FROM EXTERNAL AND INTERNAL SOURCES

CROSS REFERENCE TO RELATED APPLICATIONS

This application is a continuation of U.S. patent application Ser. No. 13/667,466, filed Nov. 2, 2012, which is a continuation of U.S. patent application Ser. No. 11/930,951, filed Oct. 31, 2007, now U.S. Pat. No. 8,321,427, which is a divisional application of U.S. patent application Ser. No. 10/699,543, filed Oct. 30, 2003, now U.S. Pat. No. 7,519,534, which claims priority to U.S. provisional patent application Ser. No. 60/422,561, filed Oct. 31, 2002, each of which is incorporated herein in its entirety by this reference thereto.

BACKGROUND OF THE INVENTION

1. Technical Field

The invention relates to speech recognition and speech directed device control. More particularly, the invention relates to a method and apparatus for the generation and augmentation of search terms from external and internal sources, in connection with speech recognition and speech directed device control.

2. Description of the Prior Art

One area of technical innovation is that of navigation of content by spoken and textual command. Such systems typically perform speech recognition by use of a grammar-based ASR (automatic speech recognition) system, where the grammar defines those terms that can be recognized. In such systems, navigated content is comprised of a catalog, content data base, or other repository, for example: currently airing broadcast TV programs, contents of a video-on-demand (VOD) system, a catalog of cell phone ring tones, a catalog of songs, or a catalog of games. Hereafter all of the above sources of content are referred to as a repository.

Content sources are updated and/or expanded on occasion, possibly periodically, possibly as frequently as daily. In some such applications as those described above, content sources are assumed, by both system architects and by system users, to reflect trends and interests in popular culture. However, known recognition systems are limited to recognition of only those phrases that are listed in grammar. Nonetheless, it is desirable to make content sources searchable by names of artists, popular topics, personalities, etc. Yet known ASR systems recognize only those elements that are listed in grammar.

It would be desirable to identify names, personalities, titles, and topics that are present in a repository, and place them into a grammar. It would also be desirable to identify names, personalities, titles, and topics that are not present in the repository, and place them into a grammar; for in this way, such names, personalities, titles and topics may at least be recognized by the ASR system, which can then report that no suitable content is present in the repository.

SUMMARY OF THE INVENTION

The presently preferred embodiment of the invention provides a method and apparatus to identify names, personalities, titles, and topics that are present in a repository. A further embodiment of the invention provides a method and apparatus to identify names, personalities, titles, and topics that are not present in the repository. A key aspect of the invention uses information from external data sources, notably non-speech, text-based searches, to expand the search terms. The expansion takes place in two forms: (1) finding plausible linguistic variants of existing search terms that are already comprehended in the repository, but that are under slightly different names; and (2) expanding the existing search term list with items that should be there by virtue of their currency in popular culture, but which for whatever reason have not yet been reflected with content items in the repository.

BRIEF DESCRIPTION OF THE DRAWINGS

FIG. 1 is a block schematic diagram showing search term generation flow according to the invention.

DETAILED DESCRIPTION OF THE INVENTION

The presently preferred embodiment of the invention provides a method and apparatus to identify names, personalities, titles, and topics that are present in a repository. A further embodiment of the invention provides a method and apparatus to identify names, personalities, titles, and topics that are not present in the repository. A key aspect of the invention uses information from external data sources, notably non-speech, text-based searches, to expand the search terms entered. The expansion takes place in two forms: (1) finding plausible linguistic variants of existing search terms that are already comprehended in the repository, but that are present under slightly different names; and (2) expanding the existing search term list with items that should be there by virtue of their currency in popular culture, but which for whatever reason have not yet been reflected with content items in the repository.

An exemplary embodiment of the invention operates as follows:

First, extract search term candidates, also referred to as candidate search terms, from external sources, for instance:

1. Published lists of frequent textual searches against popular search engines, e.g. Yahoo "top searches;"
2. Published lists of popular artists and songs, e.g. music.aol.com/songs/newsongs "Top 100 Songs;"
3. Published lists of popular tags, e.g. ETonline.com "top tags;"
4. Published lists of most-emailed stories, e.g. NYtimes.com most emailed stories, ETonline.com most emailed stories; and
5. Published news feeds, such as RSS feeds, e.g. NYtimes.com/rss.

Nominally for the first three sources listed above, the candidate search terms are clearly identified as an explicitly marked title, author, artist name, etc. and, hence, processing is purely automatic. For the final two sources listed above, a combination of automatic means, such as named entity extraction (NEE) and/or topic detection and tracking (TDT) methods, and possibly direct human intervention, are applied to the running text or titles to generate candidate search terms. However, human intervention may be used with the first group as well.

Next, extract verified search terms from internal sources, for instance:

1. Explicitly marked titles, authors, artist names, etc. that are associated to the content elements in the repository; and/or
2. Sources derived by application of named entity extraction (NEE) and/or topic detection and tracking (TDT) methods to descriptive text associated to the content elements in the repository.

EXAMPLES

Use of the topic "california fires", appearing as the tenth-most-popular searched item, as listed in the "MOST POPULAR SEARCHED" section of the website nytimes.com of Oct. 27, 2007.

Extraction of the proper name "David Brooks" from the frequently emailed article title "David Brooks: The Outsourced Brain," appearing as the second-most-popular emailed article, as listed in the "MOST POPULAR EMAILED" section of the website nytimes.com of Oct. 27, 2007.

In the presently preferred embodiment of the invention, typical (although not exclusive) means of NEE and TDT analysis may be found in:

*Foundations of Statistical Natural Language Processing*, by Chris Manning and Hinrich Schütze, MIT Press. Cambridge, Mass.: May 1999.

*Proceedings of the DARPA Broadcast News Transcription and Understanding Workshop*, Feb. 8-11, 1998, Lansdowne Conference Resort, Lansdowne, Va., available at URL nist.gov/speech/publications/darpa98/

Next, match candidate search terms against verified search terms by well-known linguistic edit distance techniques, to obtain plausible linguistic variants of verified search terms, used to generate the augmented verified search terms.

Example: "Mary J. Blige" is initial verified search term, augmented with "Mary Blige" as a variant.

Finally, by virtue of their high incidence count, repeated appearance in history as either a candidate or verified search term, or other criterion, include in the candidate search terms which do not point to actual content elements, but which the ASR system should nevertheless recognize. We refer to such elements as "null search terms."

In FIG. 1, a grammar is augmented with regard to external sources 11 and internal sources, e.g. the repository, both as discussed above.

External sources comprise, for example, explicitly marked information 12 and running text 15. Explicitly marked text may be subject to an optional count filtering process 14, providing incidence count information is available, whereby only those instances with sufficiently high incidence count are retained, while running text is processed, as discussed above, with a module 17 that performs, for example, named entity extraction (NEE) or topic detection and tracking (TDT). The data from all external sources is combined by a module 18 and an output, comprising candidate search terms (C[i]) 19 is generated. The combined output from external sources is further processed by a module 22 that performs such functions as incidence counting, low pass filtering, and other functions as desired, and is also passed to an approximate text matching module 33 (discussed below). This module 22 also receives historical information, such as a history of candidate search terms (C[i−1] . . . ) 20, a history of final search terms (S[i−1] . . . ) 21, and verified search terms (discussed in greater detail below). The output of the module 22 is provided to a further module 23, which identifies null search terms (N[i]), as discussed above.

Internal sources comprise, for example, explicitly marked information 27 and running text 28. Explicitly marked text may be subject to an optional count filtering process 29, whereby only those instances with sufficiently high incidence count are retained, while running text is processed, as discussed above, with a module 30 that performs, for example, named entity extraction (NEE) or topic detection and tracking (TDT). The data from all internal sources is combined by a module 31 and an output, comprising verified search terms (V[i]) 32 is generated. The verified search terms are used in connection with the module 22, as discussed above. The verified search terms are also provided to a module 33 for approximate text matching by linguistic edit distance techniques. The module 33 also receives candidate search terms from the module 19 as an input. The output of the module 33 is provided to a module 34 that generates augmented verified search terms (AV[i]).

The processed external sources information that is output by the module 23 and the processed internal sources information that is output by the module 34 are provided as inputs to a combining module 34 to produce final search terms (S[i]) 25, which are output.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. An apparatus for identifying names, personalities, titles, and topics, whether or not said names, personalities, titles and topics are present in a given repository, comprising:

a plurality of external data sources, comprising non-speech, unstructured published content, said sources at least including sources selected from among published lists of the text of frequent searches presented to popular text-based search engines, published lists of popular artists and song titles, published lists of most popular tags, published lists of most-emailed stories, and published news feeds;

a processor configured for extracting search term candidates from said external sources, the step of extracting further comprising:
 an automatic extraction means selected from among:
  named entity extraction (NEE);
  topic detection and tracking (TDT);
  direct human intervention; and
  a combination of NEE, TDT, and direct human intervention;

said processor configured for expanding search terms to be provided to any of an automatic speech recognition or natural language processing system, or any combination thereof, using information from said external data sources, said expanding search terms comprising matching candidate search terms against verified search terms by applying linguistic edit distance techniques to obtain plausible linguistic variants of verified search terms and further comprising:
 said processor configured for finding plausible linguistic variants of existing search terms that are already comprehended within any of said automatic speech recognition or natural language understanding systems; and
 said processor configured for using said external sources to identify search terms that should be in an existing search term list by virtue of their currency in popular culture, but which have not yet been included among content items in the repository; said processor configured for expanding said existing search term list with said identified items;
 said processor configured for using said linguistic variants to generate augmented verified search terms;
 said processor configured for establishing a set of null search terms comprising candidate search terms having a high incidence count in said historical database of candidate search terms and in said historical database of verified search terms; and said processor configured for adding said augmented verified search terms or said set of null search terms, or any combination thereof, to any of an automatic speech recognition or natural language processing system, or any combination thereof.

2. The apparatus of claim 1, wherein said processor is configured for extracting verified search terms from one or more internal sources.

3. The apparatus of claim 2, said internal sources comprising at least sources selected from among:
explicitly marked titles, authors, and artist names, that are associated to content elements in said repository.

4. The apparatus of claim 2, said internal sources comprising at least sources obtained by application of named entity extraction (NEE) and/or topic detection and tracking (TDT) methods to descriptive text associated to content elements in said repository.

5. An apparatus for identifying names, personalities, titles, and topics, whether or not said names, personalities, titles and topics are present in a given repository, comprising:
a plurality of internal data sources, comprising sources at least comprising sources selected from among: explicitly marked titles, authors, and artist names, that are associated to content elements in a repository and running text;
a processor configured for extracting verified search terms from said internal sources, the step of extracting further comprising:
an automatic extraction means selected from among:
named entity extraction (NEE);
topic detection and tracking (TDT);
direct human intervention; and
a combination of NEE, TDT, and direct human intervention;
said processor configured for expanding search terms to be provided to any of an automatic speech recognition or natural language processing system, or any combination thereof, using information from said internal data sources, said expanding search terms comprising applying linguistic edit distance techniques to obtain plausible linguistic variants of verified search terms and further comprising:
said processor configured for finding plausible linguistic variants of existing search terms that are already comprehended within any of said automatic speech recognition or natural language understanding systems;
said processor configured for using said linguistic variants to generate augmented verified search terms;
said processor configured for establishing a set of search terms comprising candidate search terms having a high incidence count in a historical database of candidate search terms and in a historical database of verified search terms; and
said processor configured for adding said augmented verified search terms to any of an automatic speech recognition or natural language processing system, or any combination thereof.

* * * * *